United States Patent
Hirakawa et al.

(10) Patent No.: US 12,531,411 B2
(45) Date of Patent: Jan. 20, 2026

(54) SWITCHING CIRCUIT, DC POWER OUTPUT APPARATUS, WIRELESS POWER TRANSMISSION SYSTEM, SOLAR POWER GENERATION SYSTEM, OUTPUT CONTROL METHOD AND PROGRAM

(71) Applicant: SoftBank Corp., Tokyo (JP)

(72) Inventors: Takashi Hirakawa, Tokyo (JP); Naoki Hasegawa, Tokyo (JP); Yuta Nakamoto, Tokyo (JP); Yoshichika Ota, Tokyo (JP)

(73) Assignee: SoftBank Corp., Tokyo (JP)

( * ) Notice: Subject to any disclaimer, the term of this patent is extended or adjusted under 35 U.S.C. 154(b) by 14 days.

(21) Appl. No.: 18/846,352

(22) PCT Filed: Feb. 14, 2023

(86) PCT No.: PCT/JP2023/004944
§ 371 (c)(1),
(2) Date: May 20, 2025

(87) PCT Pub. No.: WO2023/188898
PCT Pub. Date: Oct. 5, 2023

(65) Prior Publication Data
US 2026/0012014 A1    Jan. 8, 2026

(30) Foreign Application Priority Data

Mar. 31, 2022   (JP) .................................. 2022-059025

(51) Int. Cl.
*H02J 1/08* (2006.01)
*H02J 50/40* (2016.01)
(Continued)

(52) U.S. Cl.
CPC ............ *H02J 1/084* (2020.01); *H02J 50/402* (2020.01); *H02J 7/0024* (2013.01); *H02J 50/20* (2016.02); *H02J 2300/24* (2020.01)

(58) Field of Classification Search
CPC ............ H02J 7/0024; H02J 50/40–402; H02J 2300/24–26; H02S 40/30–38
See application file for complete search history.

(56) References Cited

U.S. PATENT DOCUMENTS

2003/0111908 A1* 6/2003 Christensen .............. H02J 1/10
307/43
2007/0034246 A1* 2/2007 Nakata .................. H02M 7/483
429/432

(Continued)

FOREIGN PATENT DOCUMENTS

CA       2 626 345 A1    4/2007
CN      101331503 A      12/2008
(Continued)

OTHER PUBLICATIONS

Notice of Reasons for Refusal for Japanese Application No. 2022-059025 (with machine translation), dated Apr. 28, 2023.
(Continued)

*Primary Examiner* — Rexford N Barnie
*Assistant Examiner* — David A Shiao
(74) *Attorney, Agent, or Firm* — Westborough IP Group, LLC

(57) ABSTRACT

Provided is a switching circuit capable of suppressing a decrease in output power even if the power generated by a plurality of DC-power supply circuits changes, and a DC-power output apparatus, a wireless-power transfer system and a solar-power generation system having the switching circuit. A connection circuit section of the switching circuit, which is disposed between a plurality of plus-input sections and a plurality of minus-input sections, and a plus-output (Continued)

section and a minus-output section, has a plurality of switches capable of respectively controlling a turn on/off so as to switch connection states between the plurality of the DC-power supply circuits, and the plus-output section and the minus-output section.

23 Claims, 16 Drawing Sheets

(51) Int. Cl.
  *H02J 7/00* (2006.01)
  *H02J 50/20* (2016.01)

(56) References Cited

U.S. PATENT DOCUMENTS

| | | | |
|---|---|---|---|
| 2009/0200985 A1 | 8/2009 | Zane et al. | |
| 2009/0212629 A1* | 8/2009 | Paull | H02J 3/46 307/60 |
| 2010/0147354 A1* | 6/2010 | Takehara | H02J 3/381 136/244 |
| 2012/0133216 A1 | 5/2012 | Amma et al. | |
| 2021/0091563 A1 | 3/2021 | Murano et al. | |
| 2023/0327452 A1* | 10/2023 | Zeman | H02J 3/38 307/82 |
| 2024/0227600 A1* | 7/2024 | Deng | B60L 53/60 |

FOREIGN PATENT DOCUMENTS

| | | |
|---|---|---|
| CN | 111418125 A | 7/2020 |
| JP | 2000-089841 A | 3/2000 |
| JP | 2009-513098 A | 3/2009 |
| JP | 2011-114949 A | 6/2011 |
| JP | 2012-043981 A | 3/2012 |
| JP | 2013-526242 A | 6/2013 |
| JP | 2019-213313 A | 12/2019 |
| KR | 10-2008-0064986 A | 7/2008 |
| WO | WO 2007/048052 A2 | 4/2007 |
| WO | WO 2011/065352 A1 | 6/2011 |
| WO | WO 2019/045083 A2 | 3/2019 |

OTHER PUBLICATIONS

Decision to Grant Patent for Japanese Application No. 2022-059025 (with machine translation), dated Sep. 29, 2023.
International Search Report and Written Opinion, Dated May 16, 2023.
Notice for Reasons of Refusal, Dated Apr. 28, 2023.

* cited by examiner

SWITCHING CIRCUIT, DC POWER OUTPUT APPARATUS, WIRELESS POWER TRANSMISSION SYSTEM, SOLAR POWER GENERATION SYSTEM, OUTPUT CONTROL METHOD AND PROGRAM

TECHNICAL FIELD

The present invention relates to a circuit for connecting plural DC-power supply circuits (for example, rectifier circuits, solar cells, etc.) and a common output section in a DC-power output apparatus (for example, a power reception apparatus of wireless power transfer, a solar-power generation apparatus, etc.), and an apparatus and a system which are provided with the circuit.

BACKGROUND ART

There is conventionally known a power reception apparatus that is provided with plural rectifier circuits (DC-power supply circuits) for rectifying reception signals received by plural antennas, as a DC-power output apparatus of wireless power transfer for transmitting electric power via radio waves such as microwaves, etc. (for example, see Patent Literature 1).

CITATION LIST

Patent Literature

Patent Literature 1: Japanese Unexamined Patent Application Publication No. 2019-213313.

SUMMARY OF INVENTION

Technical Problem

In the power reception apparatus (DC-power output apparatus) of the conventional wireless-power transfer system, since the connections of plural rectifier circuits (DC-power supply circuits) are fixed, there is a problem that, when the input power from the antenna to the rectifier circuit changes, the power reception apparatus may not be able to respond to the change and the output power from the power reception apparatus may decrease. It is noted that a similar problem may occur not only in the power reception apparatus that is provided with plural rectifier circuits, but also in a solar-power generation apparatus (DC-power output apparatus) that is provided with plural solar cells (DC-power supply circuits).

Solution to Problem

A switching circuit according to an aspect of the present invention is a switching circuit connected to a plurality of DC-power supply circuits. This switching circuit comprises a plurality of plus-input sections to which plus-output terminals of the plurality of the DC-power supply circuits are connected, a plurality of minus-input sections to which minus-output terminals of the plurality of the DC-power supply circuits are connected, a plus-output section, a minus-output section, and a connection-circuit section, which is provided between the plurality of the plus-input sections and the plurality of the minus-input sections, and the plus-output section and the minus-output section, has a plurality of switches capable of respectively controlling a turn on/off so as to switch connection states between the plurality of the DC-power supply circuits, and the plus-output section and the minus-output section.

In the foregoing switching circuit, the connection circuit section may comprise a plurality of first connection lines individually connected to the plus-output terminals of the plurality of the DC-power supply circuits, a plurality of second connection lines individually connected to the minus-output terminals of the plurality of the DC-power supply circuits, a plurality of first switches capable of respectively controlling a turn on/off, the first switches being individually disposed between the plurality of the first connection lines and the plus-output section, a plurality of second switches capable of respectively controlling a turn on/off, the second switches being individually disposed between the plurality of the second connection lines and the minus-output section, and a plurality of third switches capable of respectively controlling a turn on/off, the third switches being disposed between the first connection line and the second connection line of a combination in which the DC-power supply circuits are different from each other, among a plurality of combinations of the plurality of the first connection lines and the plurality of the second connection lines.

A DC-power output apparatus according to another aspect of the present invention comprises any one of the foregoing switching circuits, and a control section for respectively controlling the turn on/off of the first switch, the second switch and the third switch.

In the foregoing DC-power output apparatus, the first switch and the second switch may be controlled to be turned on, and the third switch may be controlled to be turned off.

In the foregoing DC-power output apparatus, the number of each of the plurality of the DC-power supply circuits, the plurality of the first connection lines, the plurality of the second connection lines, the plurality of the first switches and the plurality of the second switches may be N, and the number of the plurality of the third switches may be $N^2-N$, a first of the first switches disposed on a first of the first connection lines individually connected to the plus-output terminals of the first DC-power supply circuit may be controlled to be turned on, an N-th of the second switches disposed on an N-th of the second connection lines individually connected to the minus-output terminal of an N-th DC-power supply circuit may be controlled to be turned on, a third switch, which is disposed between an n-th (n=2 to N) of the first connection lines individually connected to the plus-output terminal of an n-th DC-power supply circuit and an (n−1)-th of the second connection lines individually connected to the minus-output terminal of an (n−1)-th DC-power supply circuit, may be controlled to be turned on, and other switches in the first switches, the second switches and the third switches may be controlled to be turned off.

In the foregoing DC-power output apparatus, the control section may respectively control the turn on/off of the plurality of the switches based on the following matrix of (N+1) rows by (N+1) columns, when the number of the plurality of the DC-power supply circuits is N, the total number of the plurality of the switches is $N^2+N$, and an on state is expressed as "1" and an off state is expressed as "0".

$$\begin{bmatrix} 0 & 1 \text{ or } 0 & \cdots & 1 \text{ or } 0 \\ 1 \text{ or } 0 & \ddots & \ddots & \vdots \\ \vdots & \ddots & \ddots & 1 \text{ or } 0 \\ 1 \text{ or } 0 & \cdots & 1 \text{ or } 0 & 0 \end{bmatrix}$$

In the foregoing DC-power output apparatus, the DC-power output apparatus may comprise a determination section for measuring voltages and currents outputted from the plus-output section and the minus-output section regarding a plurality of combinations in which an on states and an off states of the switches are different from each other, with respect to the plural switches, and determining a combination of the on state and the off state of the plurality of the switches that maximizes the power outputted from the plus-output section and the minus-output section, based on a measurement result of the voltages and currents measured for the plurality of the combinations.

In the foregoing DC-power output apparatus, the DC-power output apparatus may comprise a determination section for measuring voltages and currents outputted from the plus-output section and the minus-output section regarding a plurality of combinations in which an on state and an off state of the switches are different from each other, with respect to the plurality of the switches, and determining a failure occurrence in the DC-power supply circuit, based on a measurement result of the voltages and currents measured for the plurality of the combinations.

In the foregoing DC-power output apparatus, the DC-power output apparatus may comprise the plurality of the DC-power supply circuits, and the DC-power output apparatus may perform a switching control for all of the plural switches of the switching circuits.

In the foregoing DC-power output apparatus, the DC-power output apparatus may be a power reception apparatus of a wireless-power transfer system, and the plurality of the DC-power supply circuits may be a plurality of rectifier circuits connected to a plurality of antennas configuring a reception-antenna apparatus of the wireless-power transfer system.

In the foregoing DC-power output apparatus, the reception-antenna apparatus may be an array antenna in which the plural antennas are disposed one-dimensionally, two-dimensionally or three-dimensionally.

A wireless-power transfer system according to yet another aspect of the present invention comprises any one of the foregoing DC-power output apparatuses and a power transmission apparatus for transmitting a power transmission signal toward the DC-power output apparatus.

In the foregoing DC-power output apparatus, the DC-power output apparatus may be a power generation apparatus of a solar-power generation system, and the plurality of the DC-power supply circuits may be a plurality of power-supply circuits to which solar cells are respectively connected.

A solar-power generation system according to yet another aspect of the present invention comprises the DC-power output apparatus.

A method according to yet another aspect of the present invention is a method for controlling any one of the foregoing DC-power output apparatuses. This method includes performing a control to turn on the first switch and the second switch, and performing a control to turn off the third switch.

A method according to yet another aspect of the present invention is a method for controlling any one of the foregoing DC-power output apparatuses. In the method, the number of each of the plurality of the DC-power supply circuits, the plurality of the first connection lines, the plurality of the second connection lines, the plurality of the first switches and the plurality of the second switches is N, and the number of the plurality of the third switches is $N^2-N$. The method includes performing a control to turn on a first of the first switches disposed on a first of the first connection lines individually connected to the plus-output terminal of the first DC-power supply circuit, performing a control to turn on an N-th of the second switches disposed on a N-th of the second connection lines individually connected to the minus-output terminal of the N-th DC-power supply circuit, performing a control to turn on a third switch which is disposed between an n-th (n=2 to N) of the first connection lines individually connected to the plus-output terminal of the n-th DC-power supply circuit and an (n−1)-th of the second connection lines individually connected to the minus-output terminal of the (n−1)-th DC-power supply circuit, and performing a control to turn off other switches in the first switches, the second switches and the third switches.

A method according to yet another aspect of the present invention is a method for controlling any one of the foregoing DC-power output apparatuses. This method includes controlling respectively the turn on/off of the plurality of the switches based on the following matrix of (N+1) rows by (N+1) columns, when the number of the plurality of the DC-power supply circuits is N, the total number of the plurality of the switches is $N^2+N$, and an on state is expressed as "1" and an off state is expressed as "0".

$$\begin{bmatrix} 0 & 1 \text{ or } 0 & \ldots & 1 \text{ or } 0 \\ 1 \text{ or } 0 & \ddots & \ddots & \vdots \\ \vdots & \ddots & \ddots & 1 \text{ or } 0 \\ 1 \text{ or } 0 & \cdots & 1 \text{ or } 0 & 0 \end{bmatrix}$$

A method according to yet another aspect of the present invention is a method for controlling any one of the foregoing DC-power output apparatuses. This method includes measuring voltages and currents outputted from the plus-output section and the minus-output section regarding a plurality of combinations in which an on state and an off state of the switches are different from each other, with respect to the plurality of the switches, and determining a combination of the on state and the off state of the plurality of the switches that maximizes the power outputted from the plus-output section and the minus-output section, based on a measurement result of the voltages and currents measured for the plurality of the combinations.

A method according to yet another aspect of the present invention is a method for controlling any one of the foregoing DC-power output apparatuses. This method includes measuring voltages and currents outputted from the plus-output section and the minus-output section regarding a plurality of combinations in which an on state and an off state of the switches are different from each other, with respect to the plurality of the switches, and determining a failure occurrence in the DC-power supply circuit, based on a measurement result of the voltages and currents measured for the plurality of the combinations.

A program according to yet another aspect of the present invention is a program executed by a computer or processor provided in any one of the foregoing DC-power output apparatuses or a system that has any one of the foregoing DC-power output apparatuses. This program includes a program code for performing a control to turn on the first switch and the second switch, and a program code for performing a control to turn off the third switch.

A program according to yet another aspect of the present invention is a program executed by a computer or processor provided in any one of the foregoing DC-power output apparatuses or a system that has any one of the foregoing DC-power output apparatuses. In this program, the number of each of the plurality of the DC-power supply circuits, the plurality of the first connection lines, the plurality of the second connection lines, the plurality of the first switches and the plurality of the second switches is N, and the number of the plurality of the third switches is $N^2-N$. This program includes a program code for performing a control to turn on a first of the first switches disposed on a first of the first connection lines individually connected to the plus output terminal of the first DC-power supply circuit, a program code for performing a control to turn on an N-th of the second switches disposed on an N-th of the second connection lines individually connected to the minus-output terminal of the N-th DC-power supply circuit, a program code for performing a control to turn on a third switch which is disposed between an n-th (n=2 to N) of the first connection lines individually connected to the plus output terminal of the n-th DC-power supply circuit and an (n−1)-th of the second connection lines individually connected to the minus-output terminal of the (n−1)-th DC-power supply circuit, and a program code for performing a control to turn off other switches in the first switches, the second switches and the third switches.

A program according to yet another aspect of the present invention is a program executed by a computer or processor provided in any one of the foregoing DC-power output apparatuses or a system that has any one of the foregoing DC-power output apparatuses. This program includes a program code for controlling respectively the turn on/off of the plurality of the switches based on the following matrix of (N+1) rows by (N+1) columns, when the number of the plurality of the DC-power supply circuits is N, the total number of the plurality of the switches is $N^2+N$, and an on state is expressed as "1" and an off state is expressed as "0".

$$\begin{bmatrix} 0 & 1 \text{ or } 0 & \cdots & 1 \text{ or } 0 \\ 1 \text{ or } 0 & \ddots & \ddots & \vdots \\ \vdots & \ddots & \ddots & 1 \text{ or } 0 \\ 1 \text{ or } 0 & \cdots & 1 \text{ or } 0 & 0 \end{bmatrix}$$

A program according to yet another aspect of the present invention is a program executed by a computer or processor provided in any one of the foregoing DC-power output apparatuses or a system that has any one of the foregoing DC-power output apparatuses. This program includes a program code for measuring voltages and currents outputted from the plus-output section and the minus-output section regarding a plurality of combinations in which an on state and an off state of the switches are different from each other, with respect to the plurality of switches, and a program code for determining a combination of the on state and the off state of the plurality of the switches that maximizes the power outputted from the plus-output section and the minus-output section, based on a measurement result of the voltages and currents measured for the plurality of the combinations.

A program according to yet another aspect of the present invention is a program executed by a computer or processor provided in any one of the foregoing DC-power output apparatuses or a system that has any one of the foregoing DC-power output apparatuses. This program includes a program code for measuring voltages and currents outputted from the plus-output section and the minus-output section regarding a plurality of combinations in which an on state and an off state of the switches are different from each other, with respect to the plural switches, and a program code for determining a failure occurrence in the DC-power supply circuit, based on a measurement result of the voltages and currents measured for the plurality of the combinations.

The foregoing program for performing the determination may be a learned model created by machine learning.

Advantageous Effects of Invention

According to the present invention, it is possible to suppress a decrease in output power even if there is a change in the power generated by the plurality of the DC-power supply circuits.

DESCRIPTION OF EMBODIMENTS

Hereinafter, embodiments of the present invention are described with reference to the drawings.

A system according to a embodiment described herein is a system capable of making a flexible connection configuration of rectifier circuits so as to improve a high efficiency of output power of the power reception apparatus, by introducing a switching circuit for multiple connection of rectifier-circuits, which has plural switches capable of controlling a turn on/off, into a power reception apparatus of a wireless power transfer (WPT). In particular, it is possible to respond to a change of inputs inputted to a rectifier circuit group from plural antennas of an array antenna apparatus in the power reception apparatus of the wireless power transfer (WPT), and it is possible to separate the rectifier circuit damaged due to a diode failure, etc. from the rectifier circuit group. In addition, it is possible to reproduce any connection of the plural rectifier circuits by performing a switching control for switches including all of the plural switches in the switching circuit.

Figure 1:
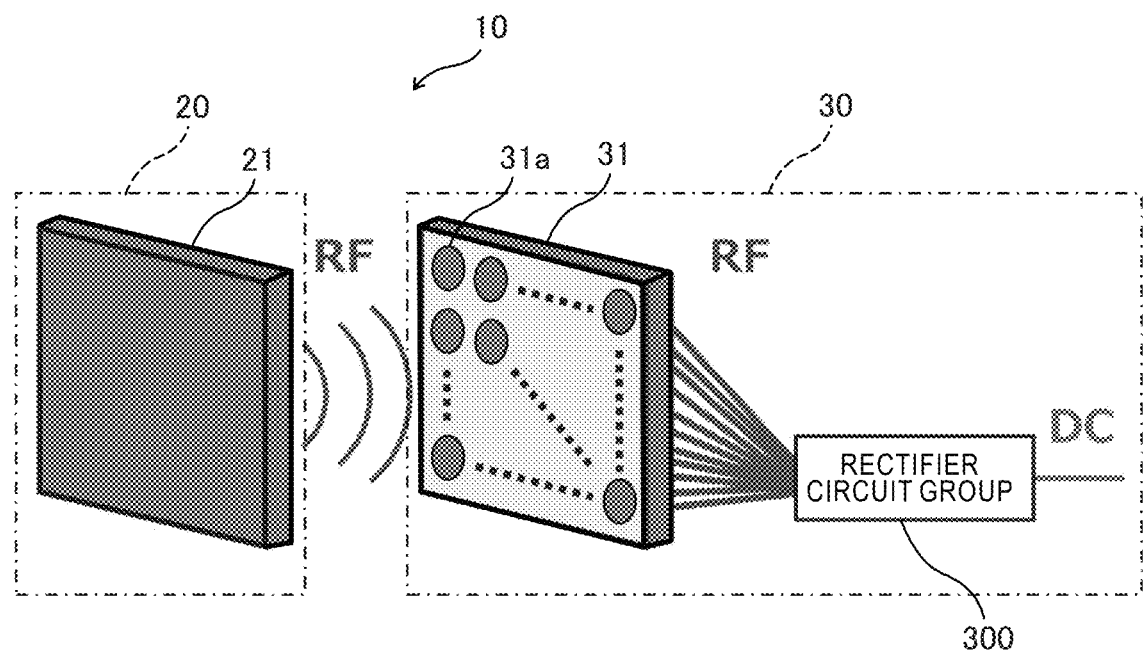
FIG. 1 is an illustration showing an example of a schematic configuration of a wireless-power transfer system according to an embodiment.

FIG. 1 is an illustration showing an example of a schematic configuration of a wireless-power transfer system 10 according to the present embodiment. The wireless-power transfer system 10 of the present embodiment is provided with a power transmission apparatus 20 for transmitting radio waves of power transmission signals, and a power reception apparatus (DC power) 30 for receiving the radio waves transmitted from the power transmission apparatus 20 and outputting a DC power. Radio waves for wireless power transfer are, for example, microwaves or millimeter waves.

The power transmission apparatus 20 has an antenna apparatus 21 configured with an array antenna in which plural antenna elements (hereinafter also referred to as "antennas") are two-dimensionally disposed. The array antenna of the power transmission apparatus 20 may be an array antenna in which plural antennas are disposed one-dimensionally or three-dimensionally.

The power reception apparatus 30 has an antenna apparatus 31 configured with an array antenna in which plural antennas 31a are two-dimensionally disposed. The array antenna of the power reception apparatus 30 may be an array antenna in which plural antennas 31a are disposed one-dimensionally or three-dimensionally. The power reception apparatus 30 has a rectifier circuit group 300 configured with a plurality of rectifier circuits (DC-power supply circuits) provided so as to correspond respectively to the plural antennas 31a of the antenna apparatus 31.

Figure 2:
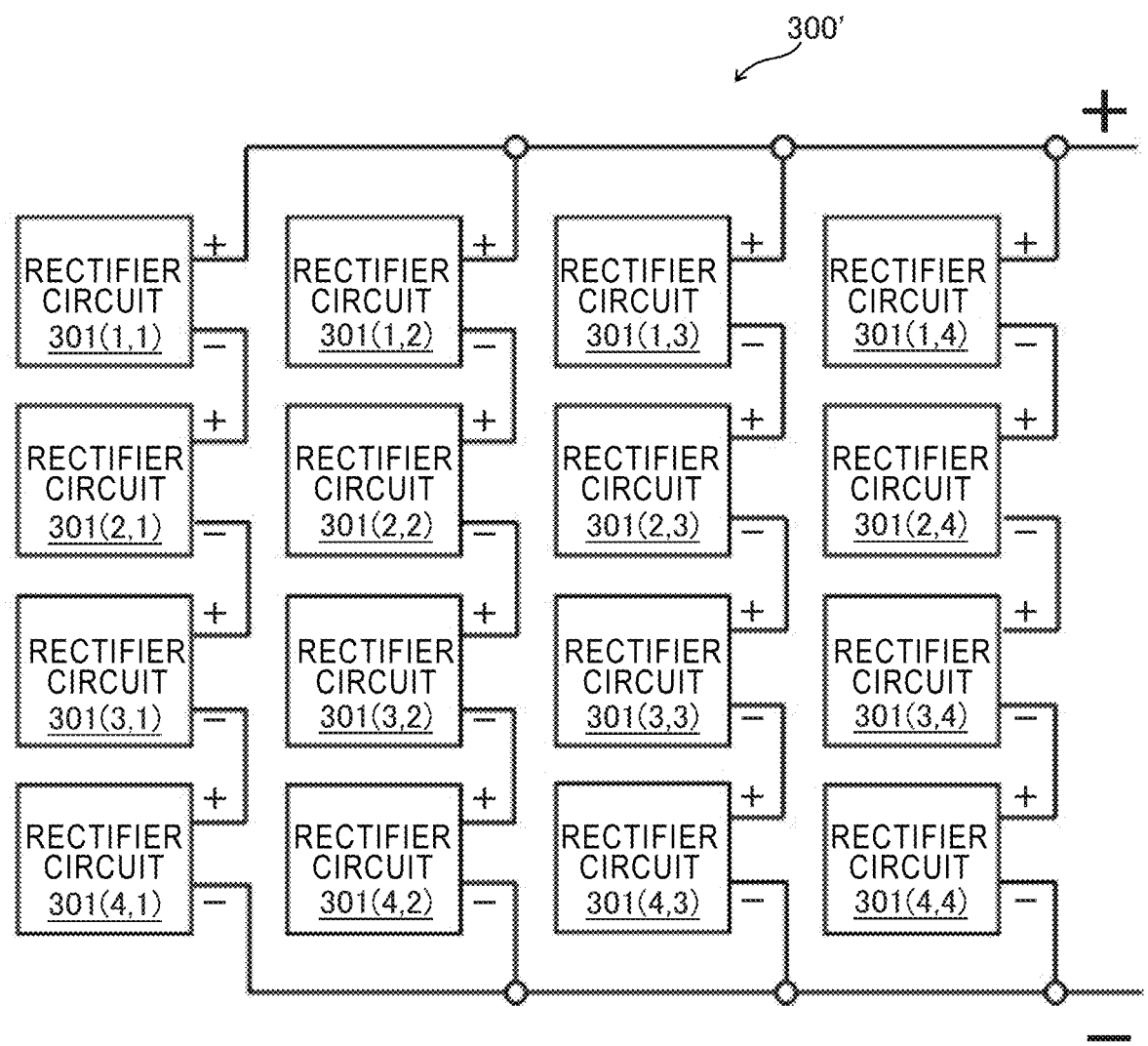
FIG. 2 is a block diagram showing an example of connections of a rectifier-circuit group according to a comparative reference example.

FIG. 2 is a block diagram showing a connection of a rectifier circuit group 300' according to a comparative reference example. The rectifier circuit group 300' in FIG. 2 has 16 rectifier circuits 301(1,1) to 301(4,4) in total, which are disposed by 4 circuits in each of the horizontal and vertical directions. The rectifier circuit group 300' has a fixed configuration in which 4 sets of series-connected rectifier circuit units 301(1,1) to 301(4,1), 301(1,2) to 301(4,2), 301(1,3) to 301(4,3) and 301(1,4) to 301(4,4) are connected in parallel, and outputs a single DC power as a whole.

Figure 3A:
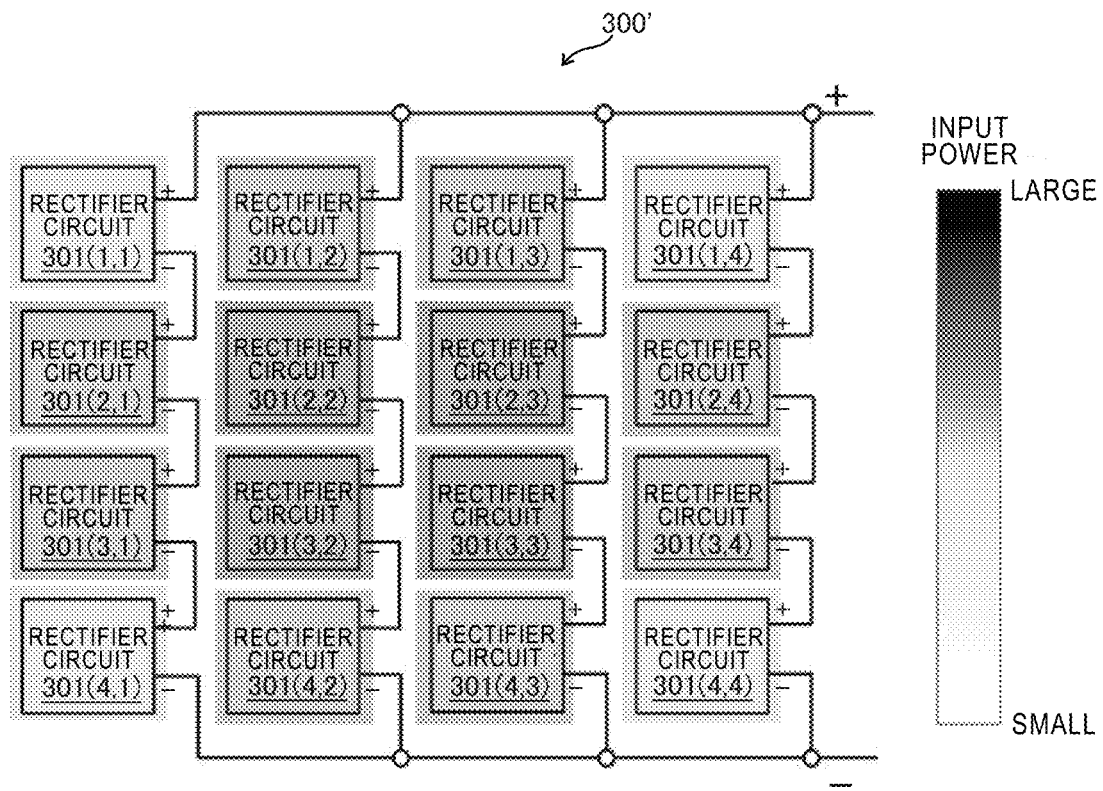
FIG. 3A is an illustration showing an input power distribution in normal times of the rectifier-circuit group according to the comparative reference example.
Figure 3B:
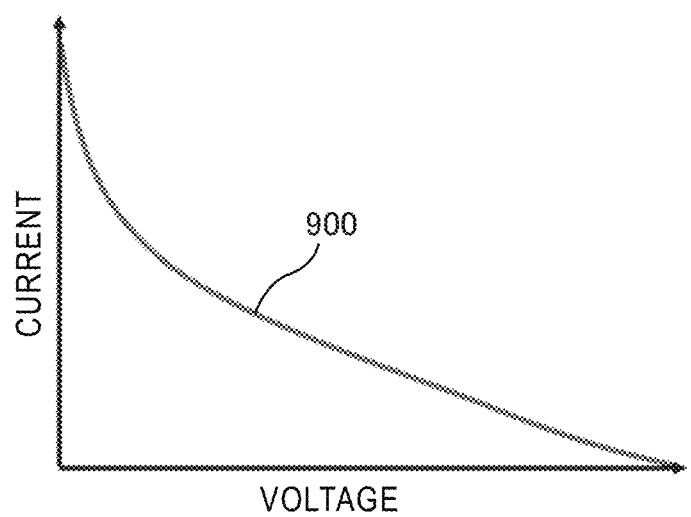
FIG. 3B is an illustration showing a current-voltage characteristics of an output power in normal times of the rectifier-circuit group of FIG. 3A.

Each of FIGS. 3A and 3B is an illustration showing an input power distribution and a current-voltage characteristics of an output power in normal times of the rectifier circuit group 300' according to the comparative reference example. Density of each of sections illustrated corresponding to the rectifier circuits 301(1,1) to 301(4,4) in FIG. 3A represents the magnitude of the input power from the corresponding antenna (the same applies to FIG. 4A described later). In the illustrated example, although the rectifier circuits in the center portion have a larger input power, the difference in input power between the 4 sets of series-connected rectifier circuit units is relatively small, therefore, it is possible to output a power with a good current-voltage characteristics 900 as shown in FIG. 3B.

Figure 4A:
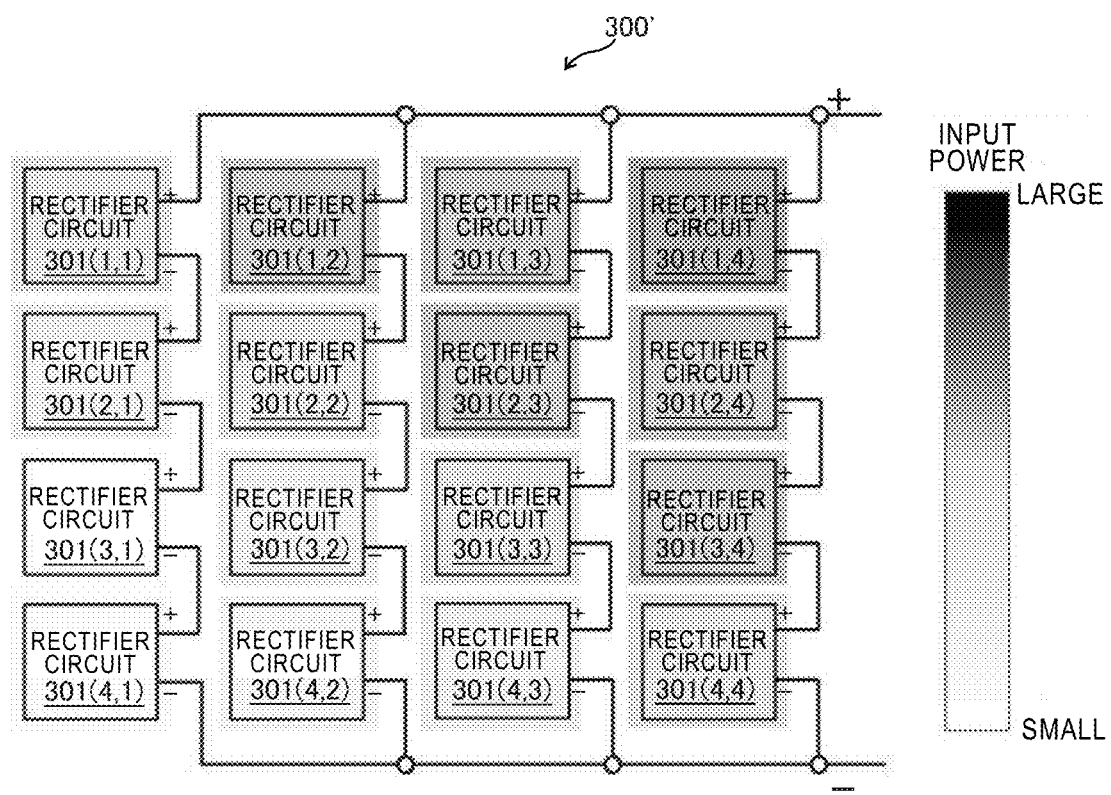
FIG. 4A is an illustration showing an input power distribution in an input change timing of the rectifier-circuit group according to the comparative reference example.
Figure 4B:
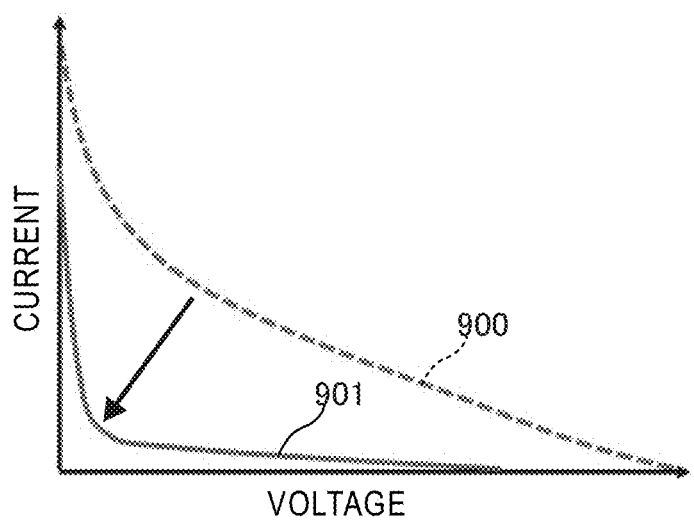
FIG. 4B is an illustration showing a current-voltage characteristics of an output power in an input change timing of the rectifier circuit group of FIG. 4A.

Each of FIGS. 4A and 4B is an illustration showing an input power distribution and a current-voltage characteristics of an output power in an input change timing of the rectifier circuit group 300' according to the comparative reference example. In the example of FIG. 4A, the rectifier circuit on the upper-right side portion has a larger input power, and the rectifier circuit on the lower-left side portion has a smaller input power. Therefore, the difference in input power between the 4 sets of series-connected rectifier circuit units is relatively large, and the output power significantly decreases as shown in the current-voltage characteristics 901 of FIG. 4B.

Figure 5A:
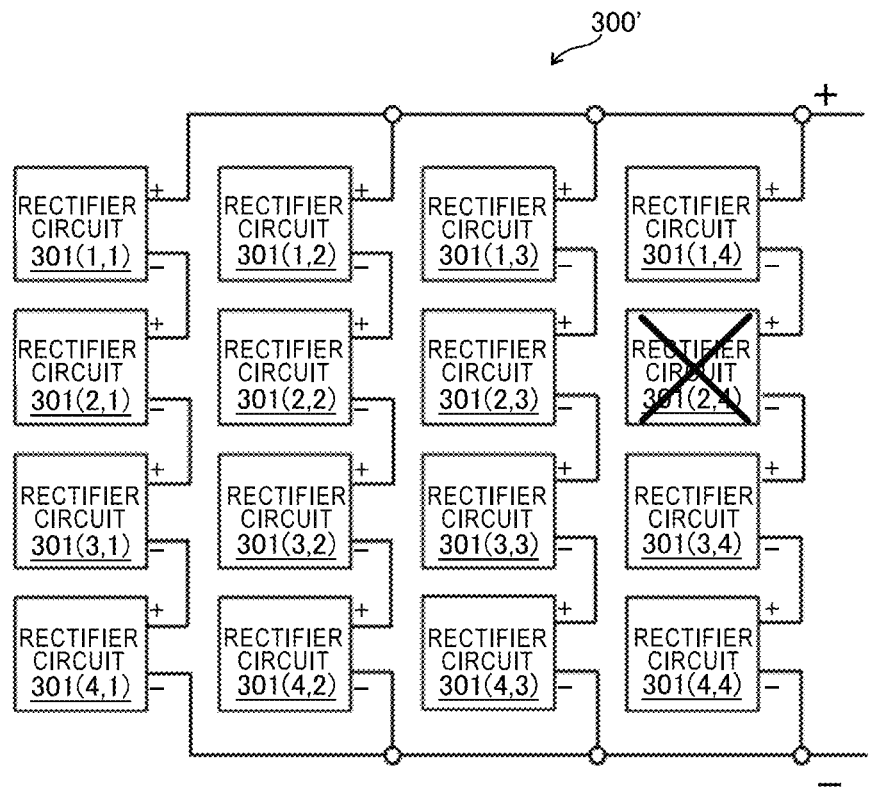
FIG. 5A is an illustration showing an influence of single failure occurrence in the rectifier circuit group according to the comparative reference example.
Figure 5B:
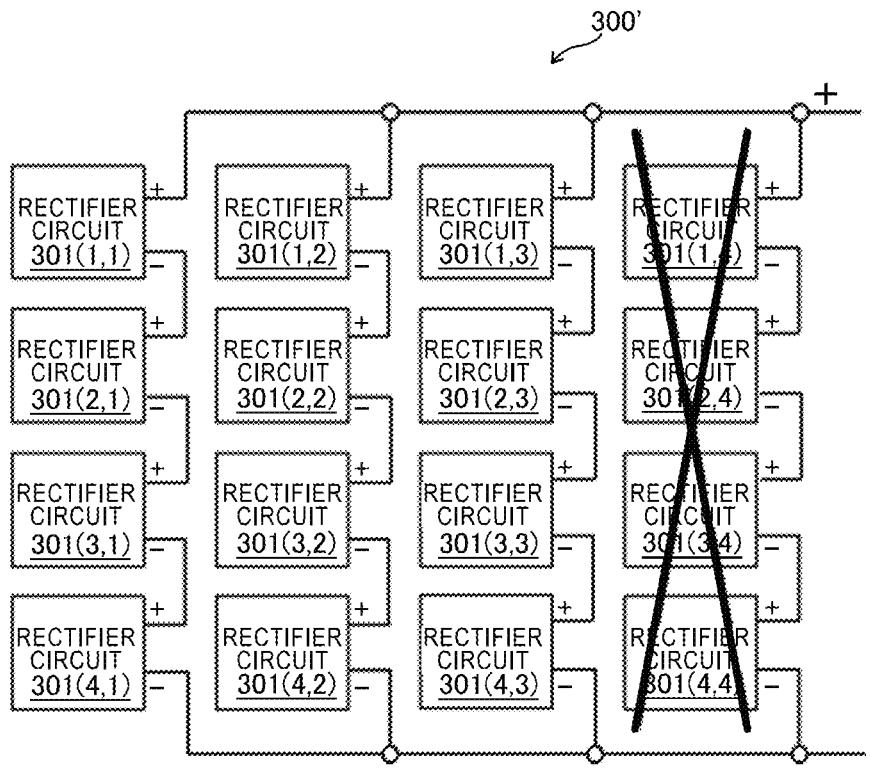
FIG. 5B is an illustration showing an influence of single failure occurrence in the rectifier circuit group according to the comparative reference example.

FIGS. 5A and 5B are illustrations showing an influence of single failure occurrence in the rectifier circuit group 300' according to the comparative reference example. In the rectifier circuit group 300' according to the comparative reference example, for example, if a single rectifier circuit 301(2,4) in the rectifier circuit group 300' fails as shown in FIG. 5A, the output of power from the entire series-connected rectifier circuit units 301(1,4) to 301(4,4) in the 4th column, including the rectifier circuit 301(2,4), stops as shown in FIG. 5B.

In the rectifier circuit group 300' of the comparative reference example in which the connections of the rectifier circuits are fixed as shown in FIGS. 3 to 5, the output power significantly decreases due to the change in the input power from the antenna apparatus or the failure of the single rectifier circuit.

Considering the above, the power reception apparatus 30 of the present embodiment is provided with a switching circuit connected to the plurality of the rectifier circuits 301 of the rectifier circuit group 300, and is configured to be capable of performing a switching control between the series connections and the parallel connections of the plurality of the rectifier circuits 301. It is noted that in the description of the following embodiments, although a case is described in which each of the number of antennas of the antenna apparatus and the number of rectifier circuits is 4 (=2×2), each number of these is not limited to the number of 4 described in this case. The present invention can be applied to any number of antennas greater than or equal to 2, and to any number of rectifier circuits greater than or equal to 2. For example, each of the number of antennas and the number of rectifier circuits may be 9 (=3×3), 16 (=4×4), or 25 (=5×5).

Figure 6:
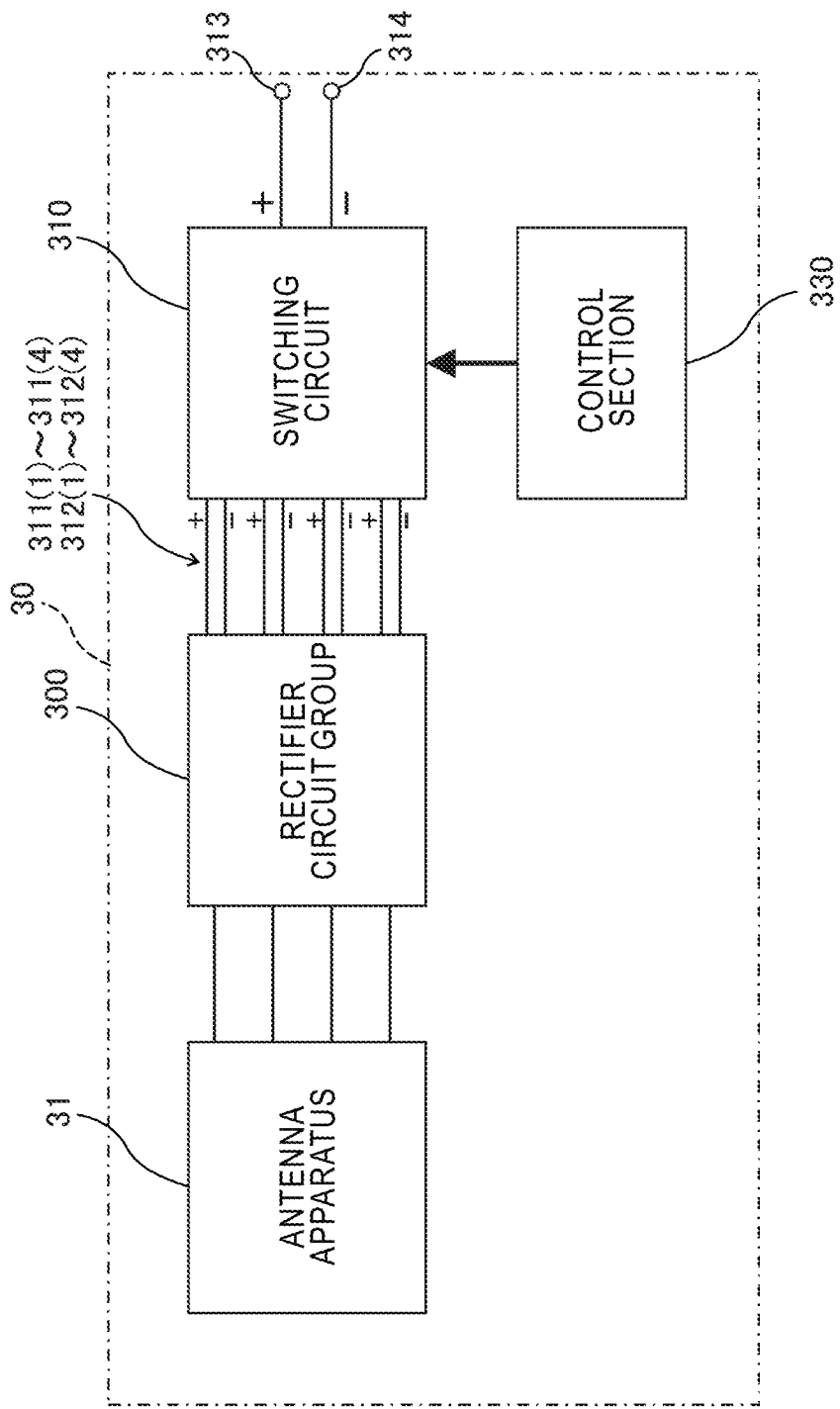
FIG. 6 is a block diagram showing an example of a configuration of a power reception apparatus according to the embodiment.

FIG. 6 is a block diagram showing an example of the configuration of the power reception apparatus 30 according to the present embodiment. In FIG. 6, a switching circuit 310 is provided at a subsequent stage of the rectifier circuit group 300 that receives input power from the antenna apparatus 31. The switching circuit 310 has a plurality of plus-input sections 311(1) to 311(4) to which plus-output terminals of the rectifier circuits as a plurality of DC rectifier circuits are connected, a plurality of minus-input sections 312(1) to 312(4) to which minus-output terminals of the plurality of the rectifier circuits are connected, a plus-output section 313 and a minus-output section 314. Further, the switching circuit 310 has a connection circuit section 310C that is provided between the plurality of the plus-input sections 311(1) to 311(4) and the plurality of the minus-input sections 312(1) to 312(4), and the plus-output section 313 and the minus-output section 314. The connection circuit section 310C has a plurality of switches capable of respectively controlling a turn on/off so as to switch connection states between the plurality of the rectifier circuits, and the plus output section 313 and the minus output section 314. The plurality of the switches provided in the connection circuit section 310C of the switching circuit 310 are controlled to be turned on/off by a control section 330.

Figure 7:
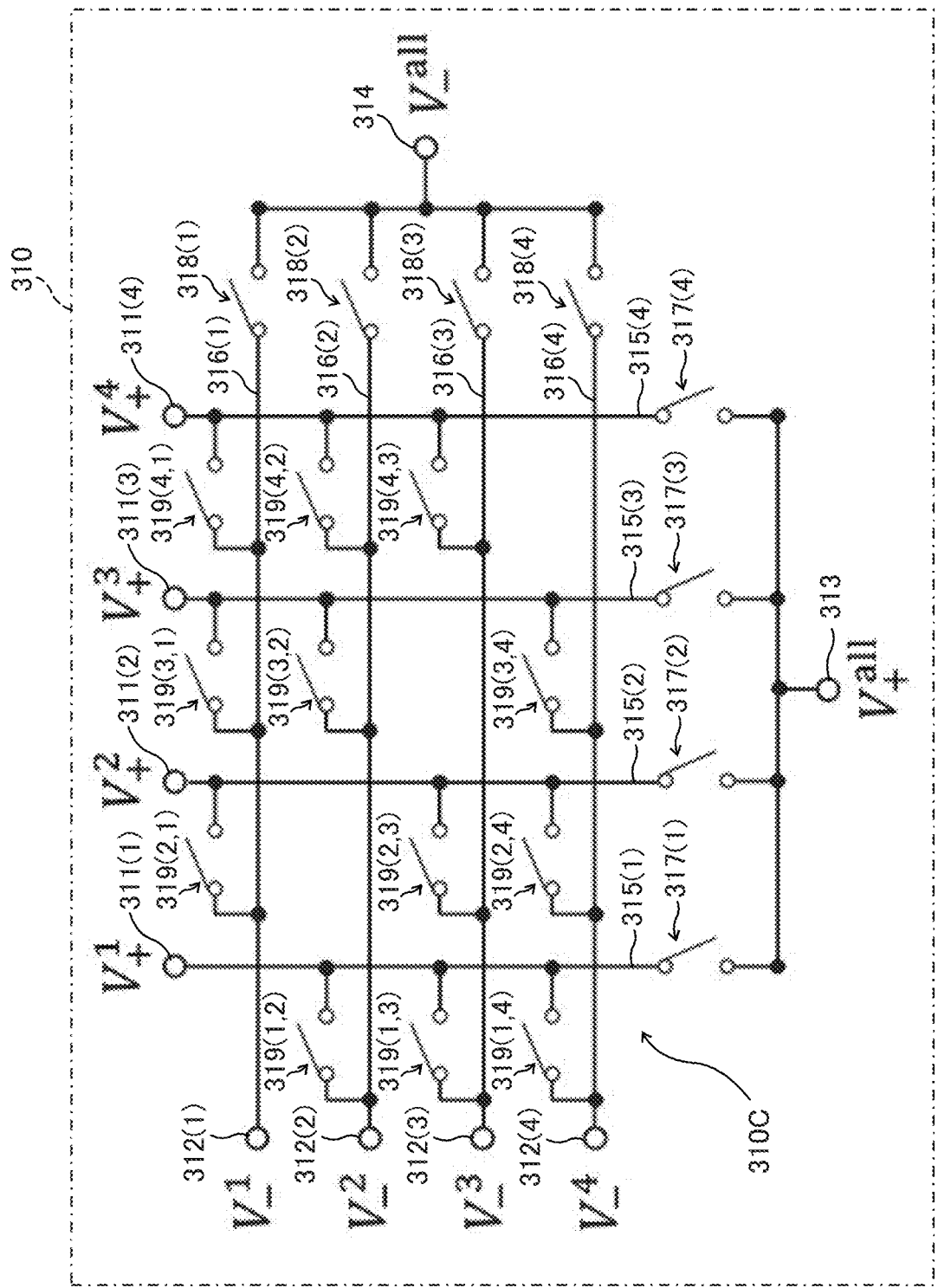
FIG. 7 is a circuit diagram showing an example of a configuration of a switching circuit according to the embodiment.
Figure 8:
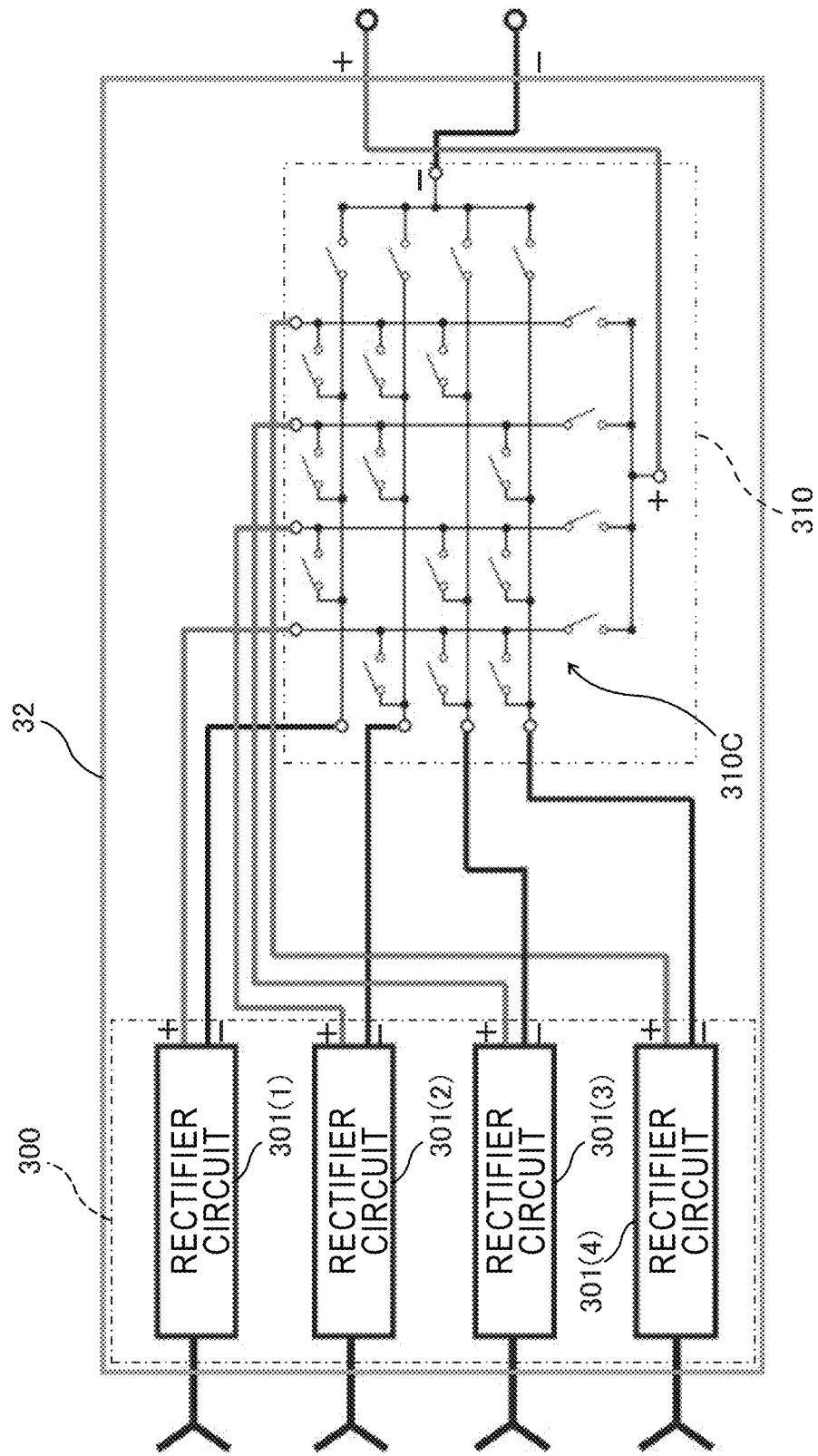
FIG. 8 is a circuit diagram illustrating an example of a power-reception apparatus circuit including the switching circuit according to the embodiment.

FIG. 7 is a circuit diagram showing an example of a configuration of the switching circuit 310 according to the present embodiment. FIG. 8 is a circuit diagram showing an example of a power-reception apparatus circuit 32 including the switching circuit 310 according to the present embodiment. In FIG. 7, the connection circuit section of the switching circuit 310 has a plurality of first connection lines 315(1) to 315(4) individually connected to the plus-output terminals of the plurality of the rectifier circuits 301(1) to 301(4), and a plurality of second connection lines 316(1) to 316(4) individually connected to the minus-output terminals of the plurality of the rectifier circuits 301(1) to 301(4). The connection circuit section has a plurality of the first switches 317(1) to 317(4), a plurality of the second switches 318(1) to 318(4), and a plurality of the third switches 319(1,2), 319(1,3), 319(1,4), 319(2,1), 319(2,3), 319(2,4), 319(3,1), 319(3,2), 319(3,4), 319(4,1), 319(4,2) and 319(4,3).

Each of the first switches 317(1) to 317(4) is a switch capable of controlling a turn on/off, which is individually disposed between the first connection lines 315(1) to 315(4) and the plus-output section 313. Each of the second switches 318(1) to 318(4) is a switch capable of controlling a turn on/off, which is individually disposed between the second connection lines 316(1) to 316(4) and the minus-output section 314.

Each of the plurality of the third switches is a switch capable of controlling a turn on/off, which is disposed between the first connection line and the second connection line of a combination in which rectifier circuits are different from each other, among a plurality of combinations of the first connection lines 315(1) to 315(4) and the second connection lines 316(1) to 316(4). For example, each of the third switches 319(1,2), 319(1,3) and 319(1,4) is disposed between the first connection line 315(1) and the second connection lines 316(2), 316(3) and 316(4). Each of the third switches 319(2,1), 319(2,3), 319(2,4) is disposed between the first connection line 315(2) and the second connection lines 316(1), 316(3), 316(4). Each of the third switches 319(3,1), 319(3,2), 319(3,4) is disposed between the first connection line 315(3) and the second connection lines 316(1), 316(2), 316(4). Each of the third switches 319(4,1), 319(4,2), 319(4,3) is disposed between the first connection line 315(4) and the second connection lines 316(1), 316(2), 316(3).

By controlling a turn on/off of each switch of the switching circuit 310 having the above configuration by the control section 330, it is possible to appropriately switch between the series connection and the parallel connection for part or all of the plurality of the rectifier circuits. In particular, by performing the switching control of switches including all of the first switches, the second switches and the third switches of the switching circuit 310 having the above configuration, it is possible to reproduce all types of connections of the plurality of the rectifier circuits.

Herein, when the number of each of the foregoing plurality of the rectifier circuits, the foregoing plurality of the first connection lines, the foregoing plurality of the second connection lines, the foregoing plurality of the first switches and the foregoing plurality of the second switches is N, the number of the plurality of the third switches is $N^2-N$, the total number of switches is $N^2+N$, and an on state is expressed as "1" and an off state is expressed as "0", the control section 330 may control a turn on/off for each of the plurality of the first switches, the plurality of the second switches and the plurality of the third switches described above, based on the following matrix of (N+1) rows by (N+1) columns.

$$\begin{bmatrix} 0 & 1 \text{ or } 0 & \cdots & 1 \text{ or } 0 \\ 1 \text{ or } 0 & \ddots & \ddots & \vdots \\ \vdots & \ddots & \ddots & 1 \text{ or } 0 \\ 1 \text{ or } 0 & \cdots & 1 \text{ or } 0 & 0 \end{bmatrix}$$

Figure 9:
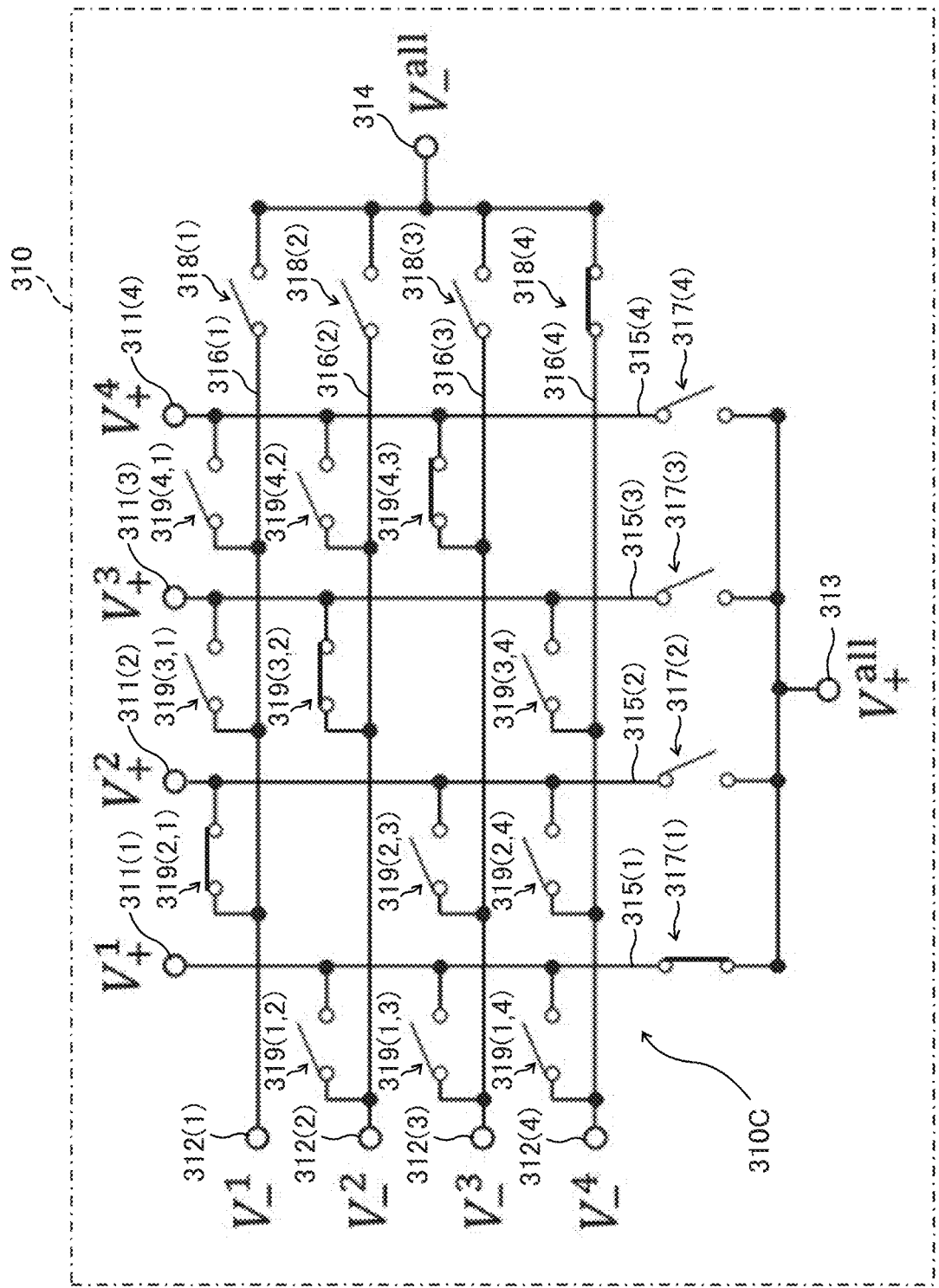
FIG. 9 is a circuit diagram showing an example of a switch control in the case that a plurality of rectifier circuits are all connected in series.

FIG. 9 is a circuit diagram showing an example of a switch control in the case that the plurality of the rectifier circuits are all connected in series. In FIG. 9, the first switch 317(1) disposed on the first connection line 315(1) is controlled to be in an on state (hereinafter this control is also referred to as "ON-control"), and the second switch 318(4) disposed on the second connection line 316(4) is ON-controlled. The third switch 319(2, 1) disposed between the first connection line 315(2) and the second connection line 316(1) is ON-controlled. The third switch 319(3,2) disposed between the first connection line 315(3) and the second connection line 316(2) is ON-controlled, and the third switch 319(4,3) disposed between the first connection line 315(4) and the second connection line 316(3) is ON-controlled. The other first switches, the other second switches and the other third switches are all controlled to be in an off state (hereinafter this control is also referred to as "OFF-control").

In the case that the number of each of the rectifier circuits 301, the first connection lines 315, the second connection lines 316, the first switches 317 and the second switches 318 is N, the control is performed as follows, for example. The first of the first switches 317(1) disposed on the first of the first connection lines 315(1) individually connected to the plus-output terminal of the first rectifier circuit is controlled to be turned on, and the N-th of the second switches 318(N) disposed on the N-th of the second connection lines 316(N) individually connected to the minus-output terminal of the N-th rectifier circuit is controlled to be turned on. The third switch (n, n−1), which is disposed between the n-th (n=2 to N) of the first connection lines 315(n) is individually connected to the plus-output terminal of the n-th (n=2 to N) rectifier circuit and the (n−1)-th of the second connection lines 316(*n*–1) is individually connected to the minus-output terminal of the (n–1)-th rectifier circuit, is controlled to be turned on. All of the other first switches, the other second switches and the other third switches are OFF-controlled.

Figure 10:
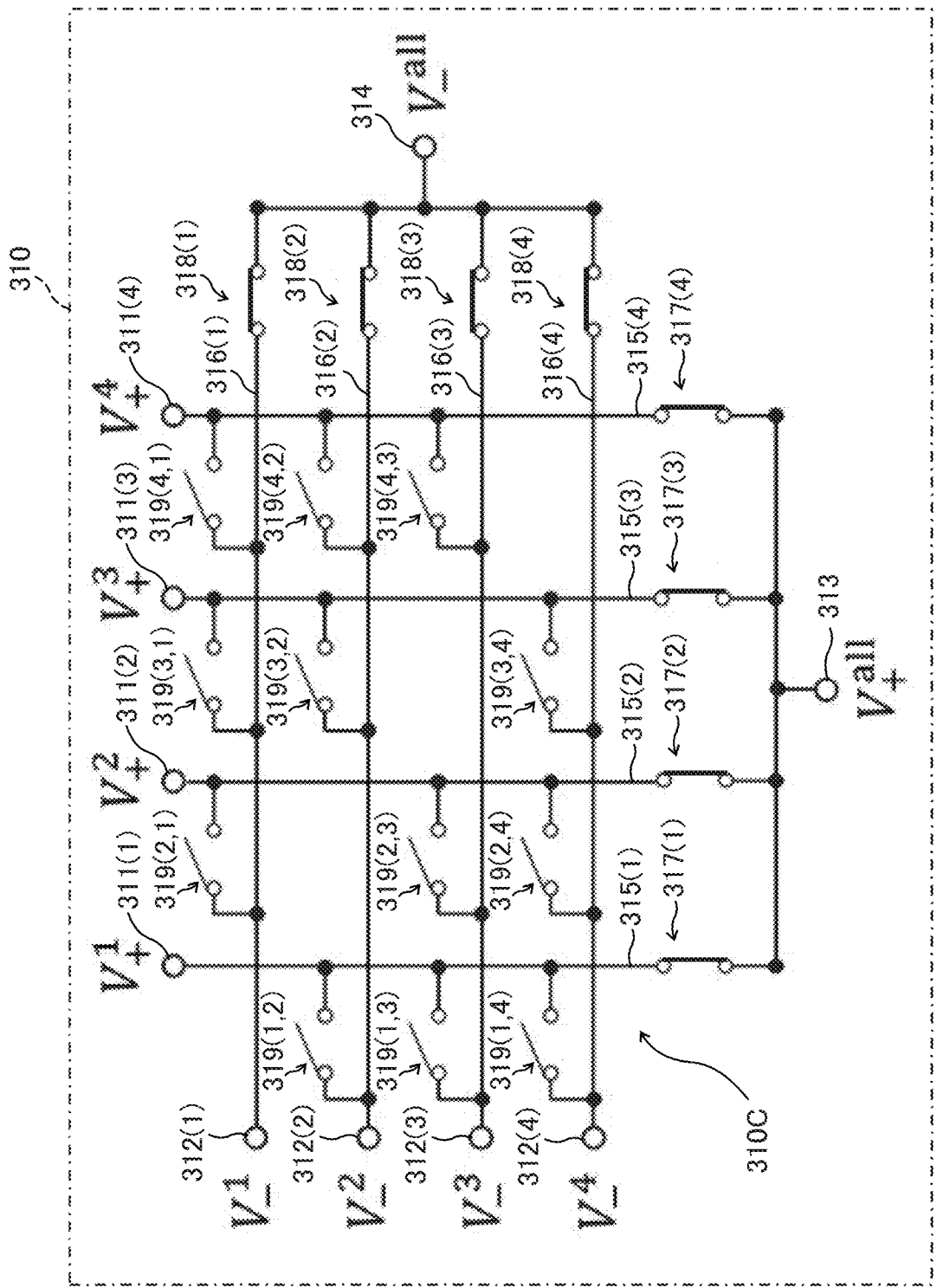
FIG. 10 is a circuit diagram showing an example of a switch control in the case that all of a plurality of rectifier circuits are connected in parallel.

FIG. 10 is a circuit diagram showing an example of switch control in the case that the plurality of the rectifier circuits are all connected in parallel. In FIG. 10, the first switches 317(1) to 317(4) and the second switches 318(1) to 318(4) are all ON-controlled. All of the third switches 319(1,2), 319(1,3), 319(1,4), 319(2,1), 319(2,3), 319(2,4), 319(3,1), 319(3,2), 319(3,4), 319(4,1), 319(4,2), and 319(4,3) are OFF-controlled.

Figure 11:
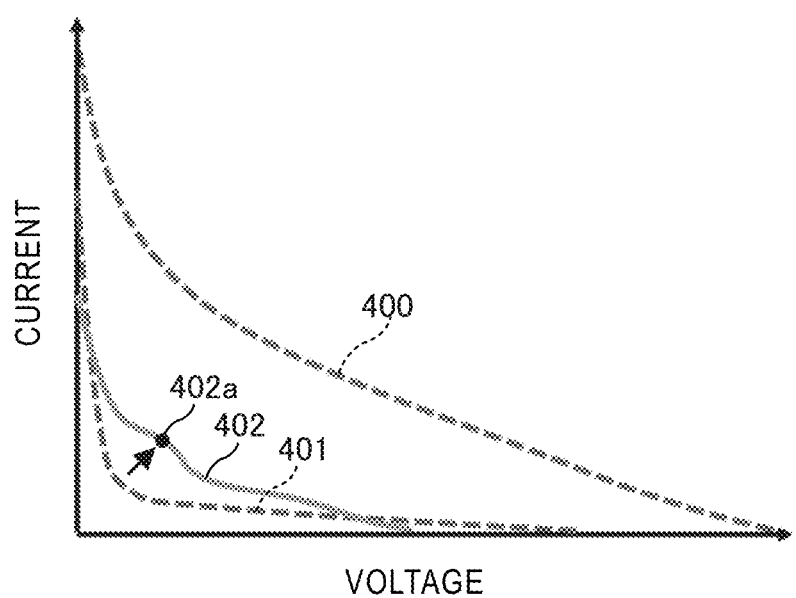
FIG. 11 is an illustration showing an example of an effect regarding a suppression of deterioration in an output-power characteristics in a power reception apparatus having the switching circuit according to the embodiment.

FIG. 11 is an illustration showing an example of an effect regarding a suppression of deterioration in an output-power characteristics in the power reception apparatus 30 having the switching circuit 310 according to the present embodiment. In FIG. 11, when the output-power characteristics (current-voltage characteristics) is about to deteriorate from the characteristic curve 400 before control to the characteristic curve 401 in the figure due to a change in the distribution of input power to the rectifier circuit group 300 of the power reception apparatus 30, by performing a turn on/off control of the switch of the switching circuit 310, the output power at the maximum power point 402*a* can be improved as shown by the characteristic curve 402 in the figure.

Figure 12A:
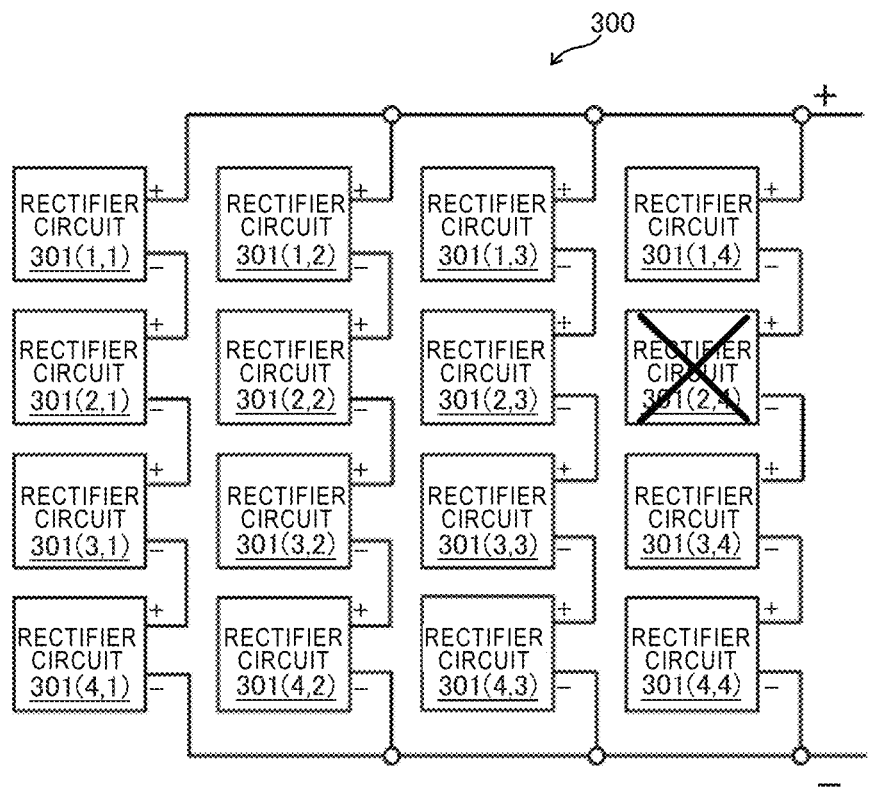
FIG. 12A is an illustration showing an example of an effect regarding a response to a failure of a rectifier circuit in the power reception apparatus having the switching circuit according to the embodiment.
Figure 12B:
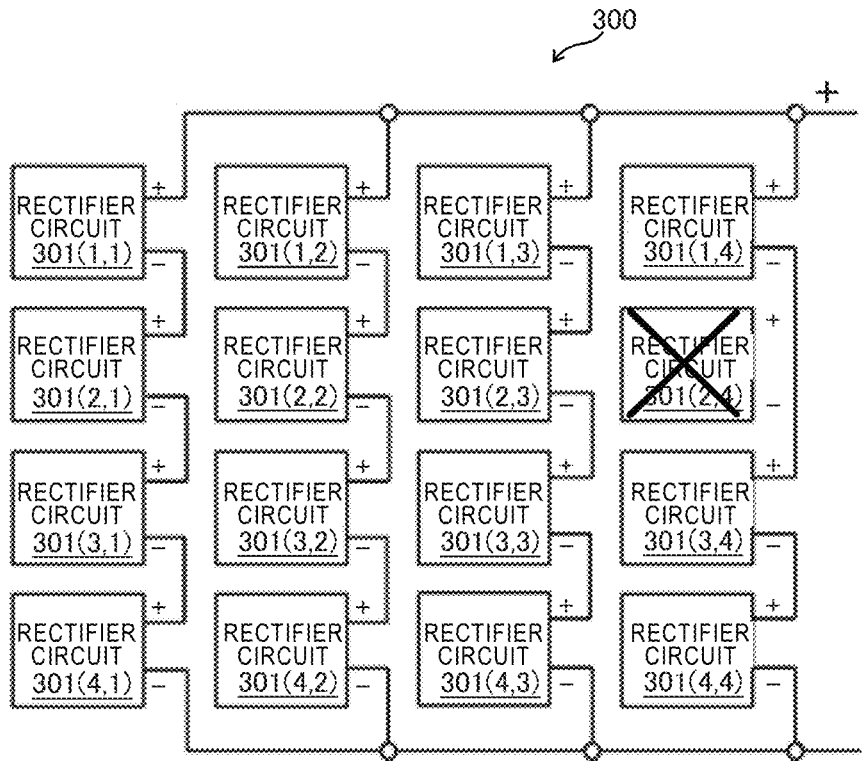
FIG. 12B is an illustration showing an example of an effect regarding a response to a failure of a rectifier circuit in the power reception apparatus having the switching circuit according to the embodiment.

FIGS. 12A and 12B are illustrations showing an example of an effect regarding a response to a failure of the rectifier circuit 301 in the power reception apparatus 30 having the switching circuit 310 according to the present embodiment. When the rectifier circuit 301(2,4) in the series-connected rectifier circuit unit in the rightmost column of the rectifier circuit group 300 is damaged due to a failure of a diode (rectifier element), etc. as shown in FIG. 12A, by performing a turn on/off control of the switches of the switching circuit 310, the failed rectifier circuit 301(2,4) can be separated from the series-connected rectifier circuit unit in the rightmost column as shown in FIG. 12B. By this disconnection of the rectifier circuit, it is possible to prevent a significant decrease in the efficiency of output power when the diode (rectifier element) of the rectifier circuit 301(2,4) in the rectifier circuit group 300 fails.

Figure 13:
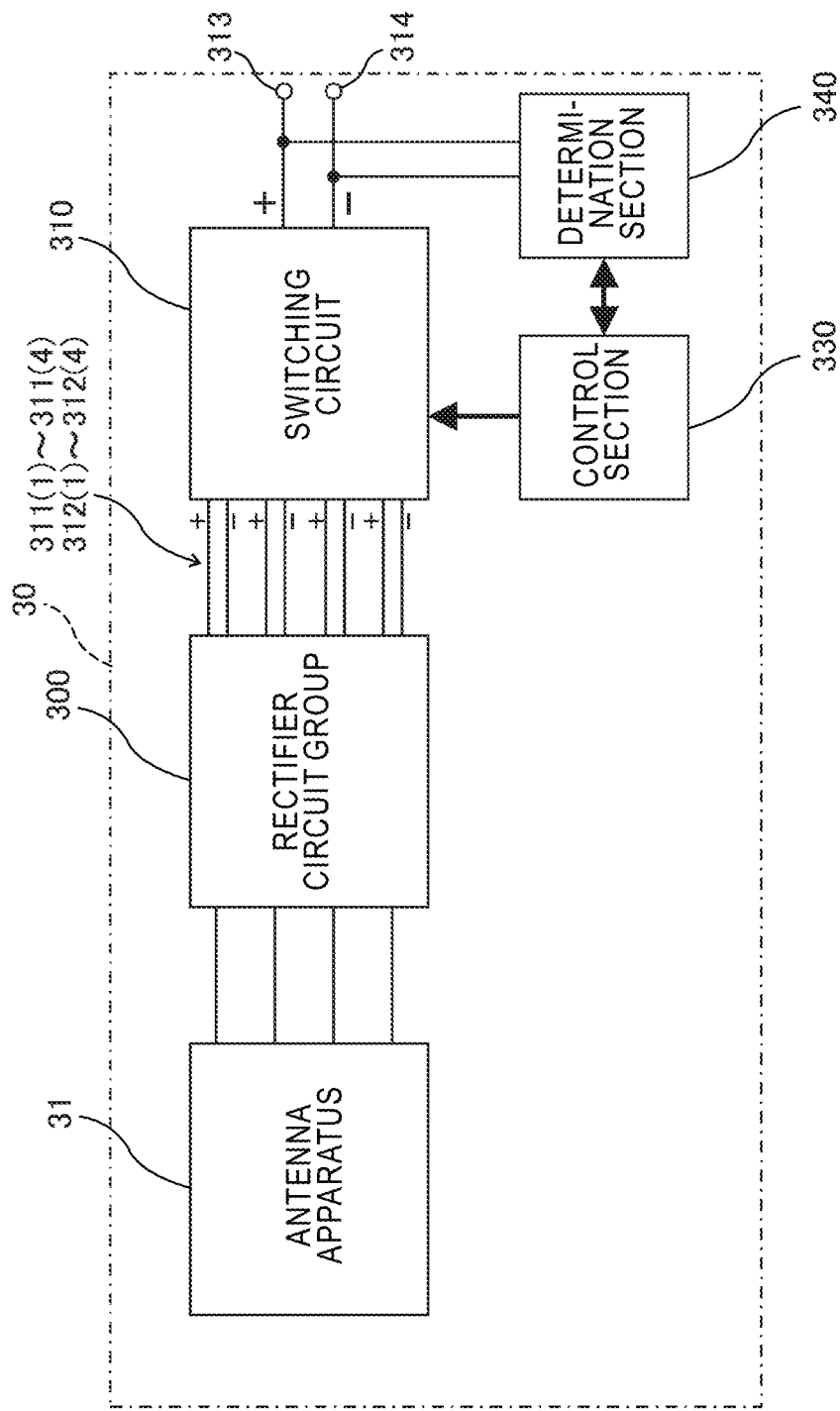
FIG. 13 is a block diagram showing another example of the configuration of the power reception apparatus according to the embodiment.

FIG. 13 is a block diagram showing another example of the configuration of the power reception apparatus 30 according to the present embodiment. It is noted that, in FIG. 13, the same parts as those of the power reception apparatus 30 in FIG. 6 described above are given the same reference numerals, and the description thereof is omitted. The power reception apparatus 30 in FIG. 13 is provided with a determination section 340 that makes a determination based on a measurement result of measuring voltages and currents outputted from the plus-output section 313 and the minus-output section 314 of the switching circuit 310. The control section 330 is capable of executing a turn on/off control for each of the plurality of the switches of the switching circuit 310, based on the determination result of the determination section 340. It is noted that the determination section 340 may be incorporated within the control section 330.

For example, the determination section 340 measures voltages and currents outputted from the plus-output section 313 and the minus-output section 314 regarding a plurality of combinations in which the on state and the off state of the switches are different from each other, with respect to the plurality of the switches of the switching circuit 310, and determines a combination of the on state and the off state of the plurality of the switches that maximizes the electric power outputted from the plus-output section 313 and the minus-output section 314, based on a measurement result of the voltages and currents measured for the plurality of the combinations. As a result, for example, it becomes possible to perform a real-time control that dynamically controls the high efficiency of the output power depending on changes ($Z_0/2$, $Z_0$, $2Z_0$) in the load (impedance) connected to the power reception apparatus 30 as shown in FIG. 14.

Figure 14:
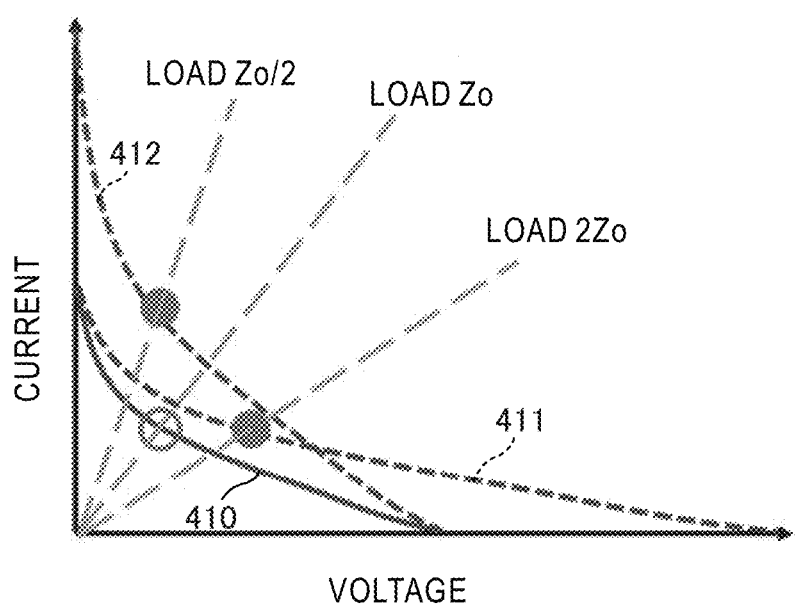
FIG. 14 is an illustration showing an example of an effect regarding a connection control of a rectifier circuit depending on a change in load (impedance) in the power reception apparatus having the switching circuit according to the embodiment.

In FIG. 14, for example, in the case of a determination result in which a load impedance $Z_0$ is detected, the switching circuit 310 is controlled so as to follow the characteristic curve 410 in the figure, in which the series connection and the parallel connection of the rectifier circuit 301 are combined in a well-balanced manner, so that the electric power is efficiently outputted at its maximum power point. In the case of a determination result in which a higher load impedance $2Z_0$ is detected, the switching circuit 310 is controlled so as to follow the characteristic curve 411 in the figure which is obtained for the rectifier circuits connected mainly in series, so that the electric power is efficiently outputted at its maximum power point. Further, in the case of a determination result in which a lower load impedance $Z_0/2$ is detected, the switching circuit 310 is controlled so as to follow the characteristic curve 412 in the figure which is obtained for the rectifier circuits connected mainly in parallel, so that the electric power is efficiently outputted at its maximum power point.

For example, the determination section 340 measures voltages and currents outputted from the plus-output section 313 and the minus-output section 314 regarding a plurality of combinations in which the on state and the off state of the switches are different from each other, with respect to the plurality of the switches of the switching circuit 310, and determines whether a failure has occurred in the rectifier circuit 301, based on a measurement result of the voltages and currents measured for the plurality of the combinations. As a result, it becomes possible to perform a dynamic failure test of the rectifier circuit in the rectifier circuit group 300 in the power reception apparatus 30 and a real-time control in which the switching circuit 310 is dynamically controlled based on a result of the failure test.

As described above, although it is described of the case in which the DC-power output apparatus is the power reception apparatus 30 of the wireless-power transfer system and each of the plurality of the DC-power supply circuits, to which the switching circuits are connected, is the rectifier circuits 301, the configurations of the DC-power output apparatus and the plurality of the DC-power supply circuits are not limited to the above-described exemplified configurations. For example, the DC-power output apparatus may be a power generation apparatus of a solar-power generation system, and the plurality of the DC-power supply circuits may be a plurality of power supply circuits to which solar cells are respectively connected.

Figure 15:
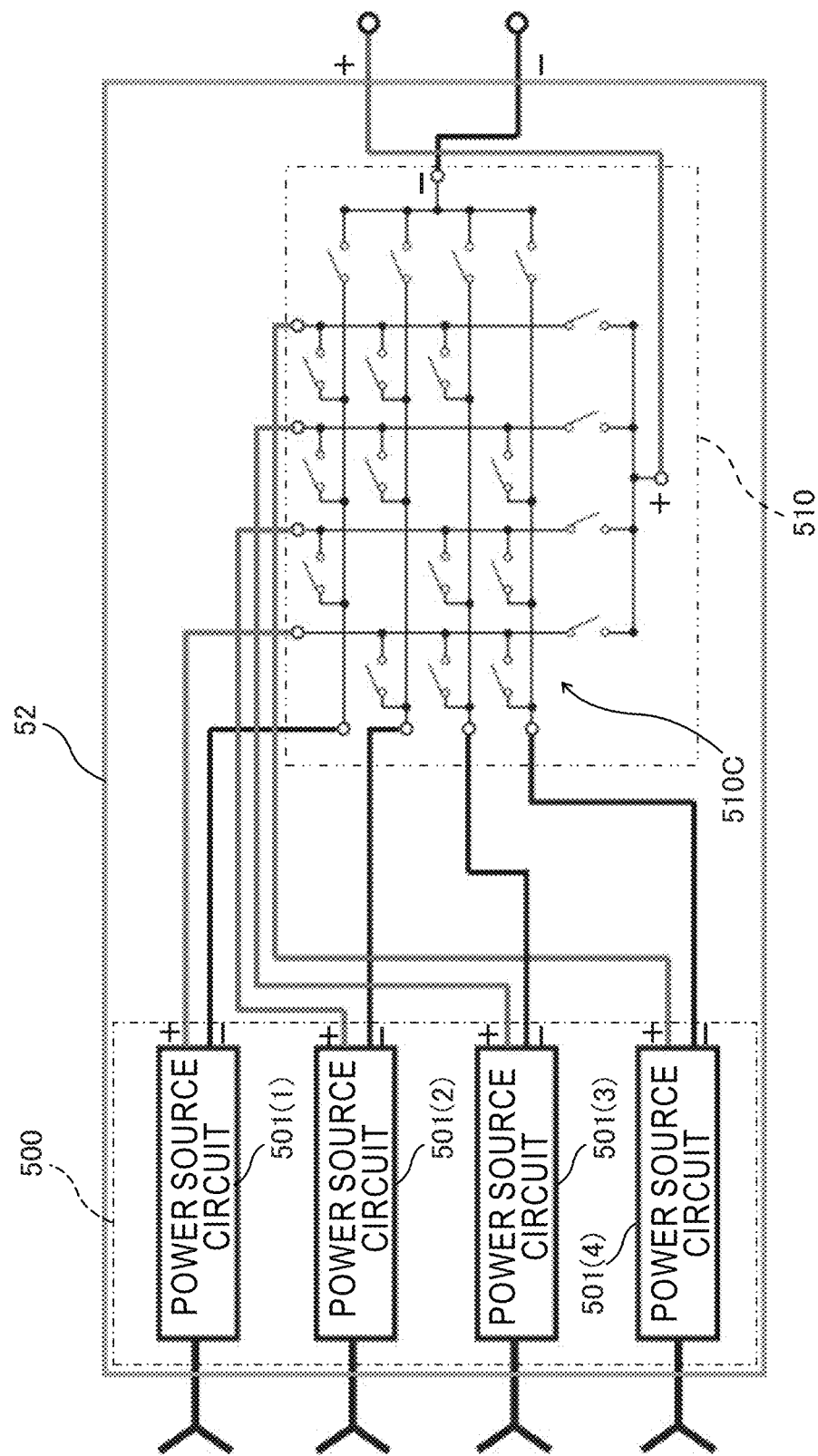
FIG. 15 is a circuit diagram showing an example of a power-generation apparatus circuit of a solar-power generation system including the switching circuit according to the embodiment.

FIG. 15 is a circuit diagram showing an example of a power-generation apparatus circuit 52 of a solar-power generation system including a switching circuit 510 according to an embodiment. The switching circuit 510 has the same configuration as the switching circuit 310 described above, and can be ON/OFF-controlled by the control section. In FIG. 15, the plurality of the first connection lines for the plus input of the switching circuit 510 are individually connected to the plus-output terminals of the plurality of the power supply circuits 501(1) to 501(4) to which solar cells are respectively connected. Further, the plurality of the second connection lines for minus input of the switching circuit 510 are individually connected to the minus-output terminals of the plurality of the power supply circuits 501(1) to 501(4).

Figure 16:
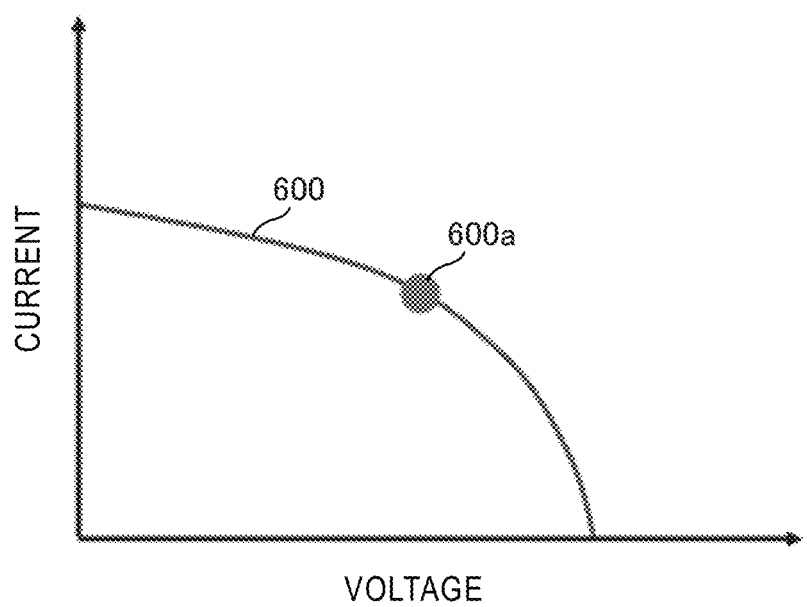
FIG. 16 is an illustration showing an example of an effect regarding a suppression of deterioration in an output-power characteristics in the power generation apparatus having the switching circuit according to the embodiment.

In the case that there is a change of the distribution of input power to the power-supply circuit group 500 of the power generation apparatus, the electric power can be outputted at the maximum power point 600*a* as shown in a characteristic curve 600 of FIG. 16, by performing the turn on/off control of the switches of the switching circuit 510.

As shown in FIGS. 15 and 16, by introducing the switching circuit 510 having the plurality of the switches that can control the turn on/off in the power-generation apparatus circuit 52 of the power generation apparatus of the solar-power generation system, a flexible connection configuration of the power supply circuits 501(1) to 501(4) can be made so as to improve a high efficiency of the output power of the power generation apparatus. In particular, it is possible to respond to a change of inputs that are inputted from the solar cells to the power-supply circuit group in the power generation apparatus of the solar-power generation system, and it is possible to disconnect the damaged power supply circuit from the power-supply circuit group.

Furthermore, in the solar-power generation systems of FIGS. 15 and 16, it is possible to reproduce all connections of the plurality of the power supply circuits by performing a switching control for switches including all of the first switches, the second switches and the third switches of the switching circuit 510 having the above-described configuration.

As described above, according to the present embodiment, it is possible to suppress a decrease of the output power, even if there is a change in the power generated by plural DC-power supply circuits (rectifier circuits, power supply circuits).

In particular, according to the present embodiment, it is possible to reproduce all connections of the plurality of the DC-power supply circuits (rectifier circuits, power supply circuits) by performing a switching control for switches including all of the plurality of the first switches, the plurality of the second switches and the plurality of the third switches in the switching circuit described above.

Since the present invention is capable of providing a wireless-power transfer system and a solar-power generation system that can suppress a decrease of the output power, it is possible to contribute to achieving Goal 9 of the Sustainable Development Goals (SDGs), "Create a foundation for industry and technological innovation".

It is noted that, the process steps and configuration elements of the system described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, switching circuit, DC-power output apparatus, power reception apparatus, power transmission apparatus, power generation apparatus, rectifier circuit, power supply circuit, various kinds of radio communication apparatuses, base station apparatus (Node B, Node G), terminal apparatus, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10: wireless-power transfer system
20: power transmission apparatus
21: antenna apparatus
30: power reception apparatus
31: antenna apparatus
31*a*: antenna
32: power-reception apparatus circuit
52: power-generation apparatus circuit
300: rectifier circuit group
301: rectifier circuit
310: switching circuit
310C: connection circuit section
311: plus input section
312: minus input section 313: plus output section
314: minus output section
315: first connection line
316: second connection line
317: first switch
318: second switch
319: third switch
330: control switch
340: judgment section
500: power-supply circuit group
501: power supply circuit
510: switching circuit
510C: connection circuit section

The invention claimed is:

1. A switching circuit connected to a plurality of DC-power supply circuits, comprising:
   a plurality of plus-input sections to which plus-output terminals of the plurality of the DC-power supply circuits are connected;
   a plurality of minus-input sections to which minus-output terminals of the plurality of the DC-power supply circuits are connected;
   a plus-output section;
   a minus-output section; and
   a connection-circuit section, which is provided between the plurality of the plus-input sections and the plurality of the minus-input sections, and the plus-output section and the minus-output section, has a plurality of switches capable of respectively controlling a turn on/off so as to switch connection states between the plurality of the DC-power supply circuits, and the plus-output section and the minus-output section, and
   wherein the connection circuit section comprises:
      a grid-shaped circuit having a plurality of first connection lines and a plurality of second connection lines which intersect with each other without contacting each other, one end of each of the first connection lines being individually connected to the plus-output terminals of the plurality of the DC-power supply circuits, one end of each of the second connection lines being individually connected to the minus-output terminals of the plurality of the DC-power supply circuits;
      a plurality of first switches capable of respectively controlling a turn on/off, each of the first switches being individually disposed between another end of each of the first connection lines in the grid-shaped circuit and the plus-output section;
      a plurality of second switches capable of respectively controlling a turn on/off, each of the second switches being individually disposed between another end of each of the second connection lines in the grid-shaped circuit and the minus-output section; and
      a plurality of third switches capable of respectively controlling a turn on/off, the third switches being disposed between the first connection line and the second connection line of a combination in which the DC-power supply circuits are different from each other, among a plurality of combinations of the plurality of the first connection lines and the plurality of the second connection lines in the grid-shaped circuit.

2. A DC-power output apparatus, comprising:
   the switching circuit according to claim 1; and
   a control section for respectively controlling the turn on/off of the plurality of first switches, the plurality of second switches and the plurality of third switches.

3. The DC-power output apparatus according to claim 2, wherein the plurality of first switches and the plurality of second switches are controlled to be turned on, and
wherein the plurality of third switches is controlled to be turned off.

4. The DC-power output apparatus according to claim 2,
wherein a number of each of the plurality of the DC-power supply circuits, the plurality of the first connection lines, the plurality of the second connection lines, the plurality of the first switches and the plurality of the second switches is N, and a number of the plurality of the third switches is $N^2-N$,
wherein a first of the first switches disposed on a first of the first connection lines individually connected to the plus-output terminals of a first DC-power supply circuit is controlled to be turned on,
wherein an N-th of the second switches disposed on an N-th of the second connection lines individually connected to the minus-output terminal of an N-th DC-power supply circuit is controlled to be turned on,
wherein a third switch, which is disposed between an n-th (n=2 to N) of the first connection lines individually connected to a plus-output terminal of an n-th DC-power supply circuit and an (n−1)-th of the second connection lines individually connected to a minus-output terminal of an (n−1)-th DC-power supply circuit, is controlled to be turned on, and
wherein other switches in the first switches, the second switches and the third switches are controlled to be turned off.

5. The DC-power output apparatus according to claim 2,
wherein the control section respectively controls the turn on/off of the plurality of the switches based on a following matrix of (N+1) rows by (N+1) columns, when a number of the plurality of the DC-power supply circuits is N, a total number of the plurality of the switches is $N^2+N$ and an on state is expressed as "1" and an off state is expressed as "0"

$$\begin{bmatrix} 0 & 1 \text{ or } 0 & \cdots & 1 \text{ or } 0 \\ 1 \text{ or } 0 & \ddots & \ddots & \vdots \\ \vdots & \ddots & \ddots & 1 \text{ or } 0 \\ 1 \text{ or } 0 & \cdots & 1 \text{ or } 0 & 0 \end{bmatrix}$$

6. The DC-power output apparatus according to claim 2,
wherein the DC-power output apparatus comprises a determination section for measuring voltages and currents outputted from the plus-output section and the minus-output section regarding a plurality of combinations in which an on state and an off state of the switches are different from each other, with respect to the plurality of the switches, and determining a combination of the on state and the off state of the plurality of the switches that maximizes the power outputted from the plus-output section and the minus-output section, based on a measurement result of the voltages and currents measured for the plurality of the combinations.

7. The DC-power output apparatus according to claim 2,
wherein the DC-power output apparatus comprises a determination section for measuring voltages and currents outputted from the plus-output section and the minus-output section regarding a plurality of combinations in which an on state and an off state of the switches are different from each other, with respect to the plurality of the switches, and determining a failure occurrence in one or more of the plurality of DC-power supply circuits, based on a measurement result of the voltages and currents measured for the plurality of the combinations.

8. The DC-power output apparatus according to claim 2, wherein the DC-power output apparatus comprises the plurality of the DC-power supply circuits, and
wherein the DC-power output apparatus performs a switching control for all of the plural switches of the switching circuits.

9. The DC-power output apparatus according to claim 2, wherein the DC-power output apparatus is a power reception apparatus of a wireless-power transfer system, and
wherein the plurality of the DC-power supply circuits are a plurality of rectifier circuits connected to a plurality of antennas configuring a reception-antenna apparatus of the wireless-power transfer system.

10. The DC-power output apparatus according to claim 9, wherein the reception-antenna apparatus is an array antenna in which the plural antennas are disposed one-dimensionally, two-dimensionally or three-dimensionally.

11. A wireless-power transfer system, comprising:
the DC-power output apparatus according to claim 9; and
a power transmission apparatus for transmitting a power transmission signal toward the DC-power output apparatus.

12. The DC-power output apparatus according to claim 2, wherein the DC-power output apparatus is a power generation apparatus of a solar-power generation system, and
wherein the plurality of the DC-power supply circuits are a plurality of power-supply circuits to which solar cells are respectively connected.

13. A solar-power generation system, comprising:
the DC-power output apparatus according to claim 12.

14. A method for controlling the DC-power output apparatus according to claim 2, comprising:
performing a control to turn on the plurality of first switches and the plurality of second switches; and
performing a control to turn off the plurality of third switches.

15. A method for controlling the DC-power output apparatus according to claim 2,
wherein a number of each of the plurality of the DC-power supply circuits, the plurality of the first connection lines, the plurality of the second connection lines, the plurality of the first switches and the plurality of the second switches is N, and a number of the plurality of the third switches is $N^2-N$, and
the method comprising:
performing a control to turn on a first of the first switches disposed on a first of the first connection lines individually connected to a plus-output terminal of a first DC-power supply circuit;
performing a control to turn on an N-th of the second switches disposed on a N-th of the second connection lines individually connected to a minus-output terminal of an N-th DC-power supply circuits;
performing a control to turn on a third switch which is disposed between an n-th (n=2 to N) of the first connection lines individually connected to a plus-output terminal of an n-th DC-power supply circuit and an (n−1)-th of the second connection lines individually connected to a minus-output terminal of an (n−1)-th DC-power supply circuit; and performing a control to turn off other switches in the first switches, the second switches and the third switches.

16. A method for controlling the DC-power output apparatus according to claim 2, the method comprising:
controlling respectively the turn on/off of the plurality of the switches based on a following matrix of (N+1) rows by (N+1) columns, when a number of the plurality of the DC-power supply circuits is N, a total number of the plurality of the switches is $N^2+N$, and an on state is expressed as "1" and an off state is expressed as "0"

$$\begin{bmatrix} 0 & 1\text{ or }0 & \cdots & 1\text{ or }0 \\ 1\text{ or }0 & \ddots & \ddots & \vdots \\ \vdots & \ddots & \ddots & 1\text{ or }0 \\ 1\text{ or }0 & \cdots & 1\text{ or }0 & 0 \end{bmatrix}$$

17. A method for controlling the DC-power output apparatus according to claim 2, the method comprising:
measuring voltages and currents outputted from the plus-output section and the minus-output section regarding a plurality of combinations in which an on state and an off state of the switches are different from each other, with respect to the plurality of the switches; and
determining a combination of the on state and the off state of the plurality of the switches that maximizes the power outputted from the plus-output section and the minus-output section, based on a measurement result of the voltages and currents measured for the plurality of the combinations.

18. A method for controlling the DC-power output apparatus according to claim 2, the method comprising:
measuring voltages and currents outputted from the plus-output section and the minus-output section regarding a plurality of combinations in which an on state and an off state of the switches are different from each other, with respect to the plurality of the switches; and
determining a failure occurrence in one or more of the plurality of DC-power supply circuits, based on a measurement result of the voltages and currents measured for the plurality of the combinations.

19. A non-transitory computer readable medium containing software that is executed by a computer or processor provided in the DC-power output apparatus according to claim 2 or a system that has the DC-power output apparatus, the software comprising:
executable code that performs a control to turn on the first switch and the second switch; and
executable code that performs a control to turn off the third switch.

20. A non-transitory computer readable medium containing software that is executed by a computer or processor provided in the DC-power output apparatus according to claim 2 or a system that has the DC-power output apparatus,
wherein a number of each of the plurality of the DC-power supply circuits, the plurality of the first connection lines, the plurality of the second connection lines, the plurality of the first switches and the plurality of the second switches is N, and a number of the plurality of the third switches is $N^2-N$, and
the software comprising:
executable code that performs a control to turn on a first of the first switches disposed on a first of the first connection lines individually connected to a plus-output terminal of a first DC-power supply circuit;

executable code that performs a control to turn on an N-th of the second switches disposed on an N-th of the second connection lines individually connected to a minus-output terminal of an N-th DC-power supply circuit;

executable code that performs a control to turn on a third switch which is disposed between an n-th (n=2 to N) of the first connection lines individually connected to a plus-output terminal of an n-th DC-power supply circuit and an (n−1)-th of the second connection lines individually connected to a minus-output terminal of an (n−1)-th DC-power supply circuit; and executable code that performs a control to turn off other switches in the first switches, the second switches and the third switches.

21. A non-transitory computer readable medium containing software that is executed by a computer or processor provided in the DC-power output apparatus according to claim 2 or a system that has the DC-power output apparatus, the software comprising:

executable code that controls respectively the turn on/off of the plurality of the switches based on the following matrix of (N+1) rows by (N+1) columns, when a number of the plurality of the DC-power supply circuits is N, a total number of the plurality of the switches is $N^2+N$, and an on state is expressed as "1" and an off state is expressed as "0"

$$\begin{bmatrix} 0 & 1 \text{ or } 0 & \ldots & 1 \text{ or } 0 \\ 1 \text{ or } 0 & \ddots & \ddots & \vdots \\ \vdots & \ddots & \ddots & 1 \text{ or } 0 \\ 1 \text{ or } 0 & \cdots & 1 \text{ or } 0 & 0 \end{bmatrix}$$

22. A non-transitory computer readable medium containing software that is executed by a computer or processor provided in the DC-power output apparatus according to claim 2 or a system that has the DC-power output apparatus, the software comprising:

executable code that measures voltages and currents outputted from the plus-output section and the minus-output section regarding a plurality of combinations in which an on state and an off state of the switches are different from each other, with respect to the plurality of the switches; and executable code that determines a combination of the on state and the off state of the plurality of the switches that maximizes the power outputted from the plus-output section and the minus-output section, based on a measurement result of the voltages and currents measured for the plurality of combinations.

23. A non-transitory computer readable medium containing software that is executed by a computer or processor provided in the DC-power output apparatus according to claim 2 or a system that has the DC-power output apparatus, the software comprising:

executable code that measures voltages and currents outputted from the plus-output section and the minus-output section regarding a plurality of combinations in which an on state and an off state of the switches are different from each other, with respect to the plurality of the switches; and executable code that determines a failure occurrence in one or more of the plurality of DC-power supply circuits, based on a measurement result of the voltages and currents measured for the plurality of the combinations.

\* \* \* \* \*